(12) United States Patent
Anderson et al.

(10) Patent No.: US 11,193,906 B1
(45) Date of Patent: Dec. 7, 2021

(54) SOLID-CONTACT ION-SELECTIVE AND REFERENCE ELECTRODES COVALENTLY ATTACHED TO FUNCTIONALIZED POLYMERS

(71) Applicant: Regents of the University of Minnesota, Minneapolis, MN (US)

(72) Inventors: Evan Anderson, Minneapolis, MN (US); Philippe Buhlmann, Minneapolis, MN (US); Sujay Chopade, Minneapolis, MN (US); Marc Hillmyer, Minneapolis, MN (US); Tim Lodge, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/818,727

(22) Filed: Mar. 13, 2020

Related U.S. Application Data (60) Provisional application No. 62/818,936, filed on Mar. 15, 2019.

(51) Int. Cl.
| | | |
|---|---|---|
| *C08F 2/46* | (2006.01) | |
| *C08F 2/50* | (2006.01) | |
| *C08G 61/04* | (2006.01) | |
| *G01N 27/333* | (2006.01) | |
| *C08J 3/24* | (2006.01) | |
| *C08J 3/28* | (2006.01) | |

(52) U.S. Cl.
CPC .......... *G01N 27/3335* (2013.01); *C08J 3/245* (2013.01); *C08J 3/28* (2013.01); *C08J 2367/02* (2013.01)

(58) Field of Classification Search
CPC ............... C08F 2/46; C08F 2/50; C08G 61/04
USPC .................. 522/144, 141, 135, 134, 1; 520/1
See application file for complete search history.

(56) References Cited

U.S. PATENT DOCUMENTS

| | | | |
|---|---|---|---|
| 5,637,642 A | 6/1997 | Boden et al. | |
| 6,884,331 B1 | 4/2005 | Van Der Wal | |
| 2005/0064182 A1* | 3/2005 | Lunsford | C09J 7/26 428/354 |

FOREIGN PATENT DOCUMENTS

| | | | |
|---|---|---|---|
| CN | 108292630 | * | 7/2018 |

OTHER PUBLICATIONS

Wakita et al, CN 108292630 Machine Translation (Year: 2018).*
Satchwill, T.; Harrison, D. J., "Synthesis and characterization of new polyvinylchloride membranes for enhanced adhesion of electrode surfaces." J. Electroanal. Chem. 1986, 202, 75-81.
Sudhoelter, E. J. R., et al. "Ion-sensing using chemically-modified ISFETs." Sens. Actuators. 1989, 17, 189-194.
Sudholter, Ernst J. R., et al. "Modification of ISFETs by covalent anchoring of poly(hydroxyethyl methacrylate) hydrogel. Introduction of a thermodynamically defined semiconductor-sensing membrane interface." Anal. Chim. Acta. 1990, 230, 59-65.
Cha, G. S.; "Electrochemical performance, biocompatibility, and adhesion of new polymer matrixes for solid-state ion sensors." Anal. Chem. 1991, 63, 1666-1672.
Reinhoudt, D. N., et al. "Development of durable K+-selective chemically modified field effect transistors with functionalized polysiloxane membranes." Anal. Chem. 1994, 66, 3618-3623.
Abramova, N., et al. "Solid contact ion sensor with conducting polymer layer copolymerized with the ion-selective membrane for determination of calcium in blood serum." Anal. Chim. Acta 2016, 943, 50-57.
Ocana, C., et al. "Calcium-selective electrodes based on photo-cured polyurethane-acrylate membranes covalently attached to methacrylate functionalized poly(3,4-ethylenedioxythiophene) as solid-contact." Talanta 2018, 186, 279-285.
Van Den Berg, A., et al. "An ISFET-based Calcium Sensor Using a Photopholymerized Polysiloxane Membrane" Sensors and Actuators B: Chemical (1991) vol. 4, Issues 3-4, 235-238.

* cited by examiner

*Primary Examiner* — Jessica Whiteley
(74) *Attorney, Agent, or Firm* — Westman, Champlin & Koehler, P.A.; Z. Peter Sawicki (57) ABSTRACT

An electrode and a method of making an electrode includes treating polymers that contain functional groups, which by surface functionalization, such as hydrolysis, ozone treatment or carbon-carbon double-bond oxidation to produce hydroxyl functional groups on the surface. Reacting methacryloyl chloride with the resulting hydroxyl functional groups thereby providing a reactive surface. Photopolymerizing or thermal polymerization of crosslinked acrylate or methacrylate polymers on the reactive surface to produce a membrane covalently bonded to the underlying substrate. In addition such an electrode can also be produced on a polystyrene substrate by reacting methacryloyl chloride with the polystyrene substrate and photopolymerizing or thermally polymerizing to produce crosslinked acrylate or methacrylate polymers on the reactive surface to produce a membrane covalently bonded to the underlying polystyrene substrate.

10 Claims, 5 Drawing Sheets
(4 of 5 Drawing Sheet(s) Filed in Color)

SOLID-CONTACT ION-SELECTIVE AND REFERENCE ELECTRODES COVALENTLY ATTACHED TO FUNCTIONALIZED POLYMERS

GOVERNMENT LICENSE RIGHTS

This invention was made with government support under CHE-1710024 awarded by National Science Foundation. The government has certain rights in the invention.

FIELD

This disclosure relates to electrodes and making electrodes where in the electrode membrane is covalently bonded to a polymer substrate.

BACKGROUND

Numerous ion-selective and reference electrodes have been developed over the years. Following the needs of point-of-care and wearable sensors, designs have transitioned from bulky devices with an aqueous inner filling solution to planarizable solid contact electrodes. However, for sensors in which a polymeric sensing or reference membrane is not held in place mechanically, delamination of the physically adhering membranes severely limits sensor lifetime, as even minimal mechanical stress or thermal expansion and contraction can result in membrane delamination and, thereby, complete device failure.

SUMMARY

This disclosure describes a method of making an electrode wherein a polymeric substrate is treated by hydrolysis, ozone treatment or carbon-carbon double-bond oxidation to produce hydroxyl functional groups on the surface of the polymeric substrate. Methacryloyl chloride is reacted with the hydroxyl functional groups of the polymeric substrate to provide a reactive surface. Photopolymerization or thermal polymerization of an acrylate or a methacrylate monomer to produce crosslinked acrylate or methacrylate polymers on the reactive surface thereby producing a sensor covalently bonded to the polymeric substrate.

In another aspect, methacryloyl chloride is reacted with a polystyrene substrate; and the methacryloyl chloride is photopolymered or thermally polymerized to produce crosslinked acrylate or methacrylate polymers on the polystyrene substrate to produce a sensor covalently bonded to the polystyrene substrate.

In another aspect, the polymeric substrate comprises a polyester, a polyamide, or a polyurethane or copolymers thereof.

In another aspect, the polyester comprises either poly (ethylene terephthalate) or poly(ethylene terephthalate glycol).

In another aspect, the polymeric substrate is treated with potassium tert-butoxide/ethylene glycol to produce hydroxyl functional groups.

In another aspect, the polymeric substrate is treated with an aqueous solution of NaOH.

In another aspect, the sensor comprises an ion selective membrane

In another aspect, the electrode produced is a reference electrode

In another aspect, the methacrylate being polymerized is methyl methacrylate.

In another aspect, the acrylate being polymerized is butyl acrylate.

In another aspect, the sensor is a potentiometric sensor, ion-sensitive field effect transistor, a voltammetric sensor, an amperometric sensor, a coulometric sensor, or an impedance sensor.

In a further aspect, an electrode comprising a polymeric substrate and a sensor comprising a cross-linked acrylate or a methacrylate or a mixture of both is covalently bonded to the polymeric substrate.

In another aspect of the electrode, the polymeric substrate comprises a polyester, a polyamide, or a polyurethane or copolymers thereof.

In another aspect of the electrode, the polyester comprises either poly(ethylene terephthalate) or poly(ethylene terephthalate glycol).

In another aspect of the electrode, the electrode has an ion selective membrane

In another aspect of the electrode, the electrode is a reference electrode.

In another aspect of the electrode, the sensor comprises a potentiometric sensor, ion-sensitive field effect transistor, a voltammetric sensor, an amperometric sensor, a coulometric sensor, or an impedance sensor.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Covalent membrane attachment to a polymer substrate is an extremely promising approach to the problem of delamination that has plagued the field of ion-selective electrodes and field effect transistors for over 30 years.

To address the problem of delamination, this disclosure describes a sensing platform based on polymer substrates that can be functionalized with reactive methacrylate groups to which polyacrylate-based sensing and polymethacrylate-based reference membranes are attached covalently. The polymeric substrate may comprise a polyester such as poly(ethylene Terephthalate) (PET), poly(ethylene terephthalate glycol) (PETG), or other polyesters, polyamides, and polyurethanes and copolymers thereof alone or in combination. In addition, the polymer substrate may be made of polypropylene, polytetrafluoroethylene and copolymers thereof or polystyrene. The polymer substrate functionalization can occur by hydrolysis, ozone treatment or carbon-carbon double-bond oxidation to produce hydroxyl functional groups on the surface. In the case of polystyrene Friedel-Crafts reaction may produce a direct graft between the membrane and the substrate.

However, it is believed that any polymer on which its surface hydroxyl functional groups may be formed such that covalent bonds subsequently occur with a cross-linked acrylate or a methacrylate when such is polymerized on the substrate's surface is within the bounds of this disclosure.

Ion-selective membranes with covalently attached or freely dissolved ionophore and ionic liquid-doped reference membranes can be directly photopolymerized onto surface-functionalized polymers which results in the formation of covalent bonds between the underlying PET and the attached membranes. The term membrane as used herein may also be a sensor comprising a potentiometric sensor, ion-sensitive field effect transistor, a voltammetric sensor, an amperometric sensor, a coulometric sensor, or an impedance sensor.

Reference electrodes thus prepared provide stable reference potentials over large electrolyte concentrations, and $H^+$- and $K^+$-selective electrodes exhibit the theoretically expected Nernstian and highly selective responses. More importantly, even extreme mechanical stress does not result in the delamination of the sensing and reference membranes from the underlying PET or PETG substrates. The electrodes of this disclosure exhibit a much better long-term performance than those with unmodified substrates.

This disclosure describes a resilient attachment of ion-selective and reference membranes to an inert sensor platform material. Specifically, the surface of a PET film (substrate) is modified. PET is an inexpensive polymer widely used for the commercial fabrication of water bottles. Hydrolysis of ester linkages exposed at the PET substrate surface are hydrolyzed using either aqueous NaOH solutions or potassium tert-butoxide in ethylene glycol.

Repeat Unit Structure of PET

Both methods result in hydroxyl functional groups that can be reacted with methacryloyl chloride to provide a reactive surface. When plasticizer-free acrylate-based ISE membranes and methacrylate-based reference membranes are photopolymerized on top of such reactive PET surfaces, the resulting crosslinked polyacrylate and polymethacrylate membranes are simultaneously covalently attached to the PET surface. Even upon application of strong forces, these membranes cannot delaminate from the underlying PET substrate. Moreover, covalently attached sensing membranes exhibit stable potentials even after those with physically adhered membranes fail.

To illustrate this concept, the following examples describe the production of a solid-contact $H^+$ selective electrode (with a covalently attached ionophore), a solid-contact $K^+$ selective electrode (with a freely dissolved ionophore), 38 and a reference electrode with an ionic-liquid-doped reference membrane that were each photopolymerized onto functionalized PET. The ion-selective membrane may have (i) only ionic sites but no ionophore, (ii) both ionic sites and an electrically neutral ionophore, (iii) both ionic sites and an electrically charged ionophore, or (iv) only an electrically charged ionophore.

Although, the examples below describe $H^+$ and $K^+$ selective electrodes other ion-selective sensors for $Li^+$, $Na^+$, $K^+$, $Rb^+$, $Cs^+$, $NH_4^+$, $Mg^{2+}$, $Ca^{2+}$, $Sr^{2+}$, $Ba^{2+}$, $Fe^{3+}$, $Cu^{2+}$, $Ag^+$, $Zn^{2+}$, $Cd^{2+}$, $Hg^{2+}$, $Tl^+$, $Pb^{2+}$, carbonate, bicarbonate, $SCN^-$, $NO_2^-$, $NO_3^-$, $OH$, phosphate, sulfite, sulfate, $Cl^-$, $ClO_4^-$, and I— are also contemplated.

Examples

Surface Functionalization of PET

The surface functionalization of PET sheets with aqueous solutions of NaOH or solutions of potassium tert-butoxide in ethylene glycol were monitored by contact angle measurements. Hydrolysis of ester groups exposed on the surface of PET with NaOH resulted in both carboxylic acid and hydroxyl functional groups, whereas hydrolysis with potassium tert-butoxide in ethylene glycol resulted in two types of hydroxyethyl functional groups, i.e., 2-hydroxyethyl ester and 2-hydroxyethyl ether groups. Although these two methods of hydrolysis are specifically mentioned, other ways of hydrolyzing the surface of PET are contemplated as part of this disclosure.

Further reaction of the hydrolyzed PET surfaces with methacryloyl chloride at room temperature resulted in modification of the carboxylic acid and hydroxyl functional groups, forming anhydride and ester terminated polymer chains. However, upon workup, reaction of the anhydride groups with water reformed the carboxylic acid. Contact-angle measurements of unfunctionalized PET (see below) and functionalized PET (see below) as determined with droplets of purified water as well as 10 mM phosphate buffer (pH=12.3) are presented in Table 1.

In Table 1, Contact angles of $H_2O$ and 10 mM phosphate buffer (pH=12.3) on unfunctionalized and differently functionalized PET. Results are reported with 95% confidence intervals (n=6).

Referring to Table 1, the contact angle of water droplets on unmodified PET, Surface 1, did not differ statistically from the contact angle measured with basic solution, which agrees with the expected absence of acidic functional groups on PET. Upon hydrolysis with NaOH to Surface 2, the contact angles decreased, which is consistent with a more hydrophilic surface, as previously reported. In addition, contact angles for Surface 2 were statistically lower when using the basic solution. This can be explained by the carboxylic acid groups that are formed by NaOH hydrolysis. Also, after reaction of Surface 2 with methacryloyl chloride to give Surface 3, contact angles determined with water were still higher than those measured with basic solution, indicating the presence of carboxylic functional groups. In comparison, upon reaction of PET surfaces with tert-butoxide in ethylene glycol to Surface 4, contact angles were lower than for PET, but did not depend on the solution used to measure the contact angle. This indicates that terephthalate ester groups were successfully converted to 2-hydroxylethyl esters while avoiding formation of carboxylic acid groups. Consistent with this finding, the contact angles after reaction of Surface 4 with methacryloyl chloride to Surface 5 did not exhibit a dependence on the pH of the test solution either. Attempts were also made to monitor the different steps of the surface functionalization by attenuated total reflectance infrared spectroscopy (data not shown), but no changes in spectral features were observed.

Carboxylic acid groups have a high hydrophilicity and might promote the formation of a water layer in between PET and a reference or ion-selective membrane covalently attached to it. Moreover, surface functionalization involving treatment with potassium tert-butoxide in ethylene glycol may result in a surface concentration of methacryloyl ester groups that is twice as large than with the NaOH hydrolysis route ending in Surface 3. Therefore, the synthesis route resulting in Surface 6 was chosen for all results presented below.

Butyl Acrylate Membrane

Peeling tests were performed to assess qualitatively the effect of surface functionalization on the adhesion of butyl acrylate membranes to the underlying PET substrate. For this purpose, cross-linked butyl acrylate membranes prepared by placement of a mixture of butyl acrylate as monomer, 1,6-hexanediol diacrylate as crosslinker, and 2,2-dimethoxy-2-phenylacetophenone as photoinitiator onto the methacryloyl functionalized Surface 6 and irradiation with a broad band UV source. For comparison, analogous experiments were also performed with unfunctionalized PET. Images taken after attempting to peel the membranes from the PET surfaces are presented in FIG. 1. All membranes were easily removed from native PET as a single sheet. However, membranes polymerized onto Surface 6 could not be removed even by scratching the surface with tweezers.

Figure 1:
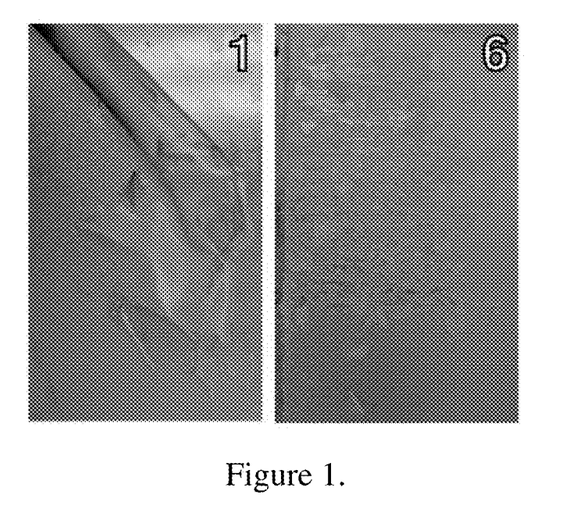
FIG. 1 is a photographic image showing adhesion of crosslinked butyl acrylate membranes to native PET, Surface 1, (left) and functionalized PET, Surface 6 (right).

FIG. 1 illustrates adhesion of crosslinked butyl acrylate membranes to native PET, Surface 1, (left) and functionalized PET, Surface 6 (right). Polymer membranes could be easily removed from Surface 1 in one piece but all efforts to remove them from Surface 6 failed. Scratches on Surface 6 resulted from attempted removal with tweezers. Image contrast in FIG. 1 was enhanced for improved visibility.

TABLE 1

Surface functionalization of PET.
Repeat unit structure of PET.

| PET Surface[a] | $H_2O$ | 10 mM phosphate buffer (pH = 12.3) |
|---|---|---|
| 1 | 75.0 ± 1.1 | 75.5 ± 1.3 |
| 2 | 59.6 ± 1.3 | 53.4 ± 1.2 |
| 4 | 64.25 ± 1.0 | 63.4 ± 1.0 |
| 3 | 69.2 ± 1.6 | 64.5 ± 1.3 |
| 6 | 71.8 ± 1.1 | 71.3 ± 1.7 |

Solid-Contact H$^+$-Selective Electrode with Covalently Attached Ionophore

Figure 2:
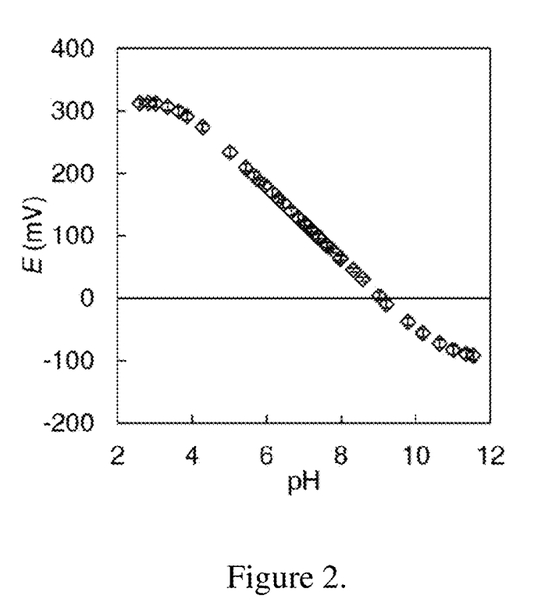
FIG. 2 is a graphical view of potentials, E, of solid contact-selective electrodes as a function of solution pH.

Photopolymerization of H$^+$-selective membranes comprising covalently attached 2-(dimethylamino) ethyl methacrylate groups as ionophore resulted in transparent membranes that strongly adhered to functionalized PET, Surface 6. After conditioning, the membranes turned opaque. Response to pH was tested in 10 mM phosphate buffer solutions by pH adjustment with NaOH and HCl (FIG. 2). Measurements of six identically prepared electrodes resulted in a Nernstian slope of 57.93±0.15 mV/decade, an electrical resistance of 52±44 MΩ, a linear range from pH 3.76±0.10 to 10.41±0.20, and selectivities (logKKI,JPOT) toward K$^+$, Li$^+$, and Na$^+$ of −8.9±0.1, −9.3±0.1, and −9.3±0.1, respectively. Previous reports of plasticizer-free H$^+$-selective membranes with crosslinked polyacrylate matrices and tridodecylamine as a freely dissolved ionophore exhibited a slightly narrower linear range of 5.0-11.0.38 In addition, the selectivities measured were within error identical to those reported (logKKI,JPOT values of −9.5, —9.5±0.1, and −9.3±0.1 toward K$^+$, Li$^+$, and Na$^+$, respectively).

In FIG. 2, potentials, E, of solid contact-selective electrodes as a function of solution pH are illustrated. The x-axis values were determined using a pH glass electrode. Black diamonds represent the average value of six identically prepared solid contact electrodes, and the error bars represent 95% confidence intervals for six electrodes. E was measured relative to a free-flowing double-junction reference electrode. All E values are corrected for liquid junction potentials at the free-flowing double junction.

Figure 3:
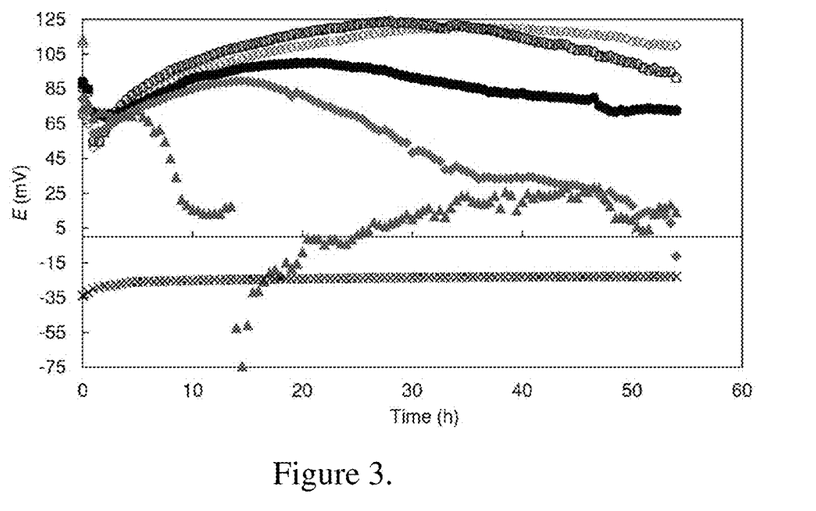
FIG. 3 is a graphical view of potentials, E, of solid contact $H^+$-selective electrodes over time in a 10 mM phosphate buffer solution (pH=0.7.1).

Long-term potential stabilities were measured to be −410±260 μV/h from 15-54 h (FIG. 3). To test the improvement of long-term stability provided by the covalent attachment of the H$^+$-selective membranes, two tests were conducted. In the first, H$^+$-selective membranes were deposited onto native PET, Surface 1, and functionalized PET, Surface 6. The potential of each of these electrodes was monitored in a pH buffered solution for 54 hours (see FIG. 3). Two out of the three electrodes with native PET, Surface 1, failed after 4 and 14 hours, respectively. Failure of these electrodes is indicated by a decrease in the measured potential, E. However, all three electrodes that were deposited onto functionalized PET, Surface 6, provided stable potentials throughout the duration of the experiment. No visual delamination of any membrane was noted; however, failure of electrodes with native PET, Surface 1, likely resulted from the formation of a water layer between the PET and H$^+$-selective membrane.

FIG. 3 illustrates, potentials, E, of solid contact H$^+$-selective electrodes over time in a 10 mM phosphate buffer solution (pH=0.7.1). Empty black circles, blue diamonds, and red triangles are H$^+$-selective electrodes with functionalized PET, 6. Filled black circles, blue diamonds, and red triangles are H$^+$-selective electrodes with native PET, 1. Black X are the potentials from a pH glass electrode.

Figure 4:
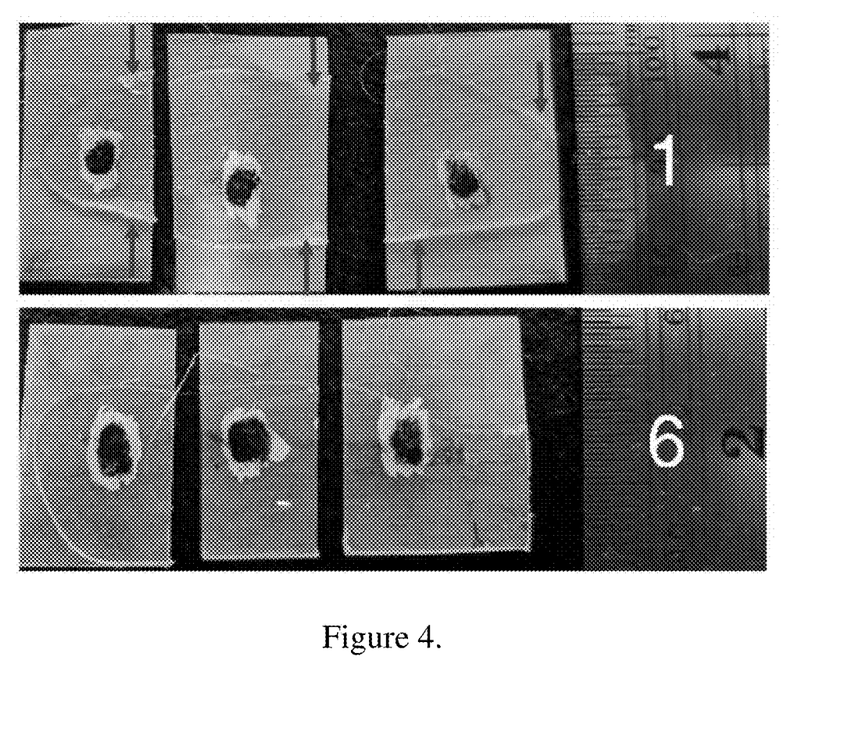
FIG. 4 are photographic images taken after repetitive bending of $H^+$-selective electrodes.

As a second test of the improvement from covalent attachment, H$^+$-selective membranes deposited onto native PET, Surface 1, and functionalized PET, Surface 6, were subjected to repetitive bending (~ 100 times) over a period of five minutes (see FIG. 4). After that time, the edges of membranes deposited onto native PET, Surface 1, began to delaminate from the PET (see FIG. 4). No delamination of membranes can be seen on the functionalized PET, Surface 6. This test indicates that covalent attachment of ion-selective membranes would allow for their use in applications where electrodes would routinely be mechanically stressed.

In FIG. 4, images were taken after repetitive bending of H$^+$-selective electrodes. Numbers in the Figure correspond to PET functionalization. Arrows indicate delamination of the H$^+$-selective membranes from native PET, Surface 1.

Solid-Contact K$^+$-Selective Electrode with Freely Dissolved Ionophore

Figure 5:
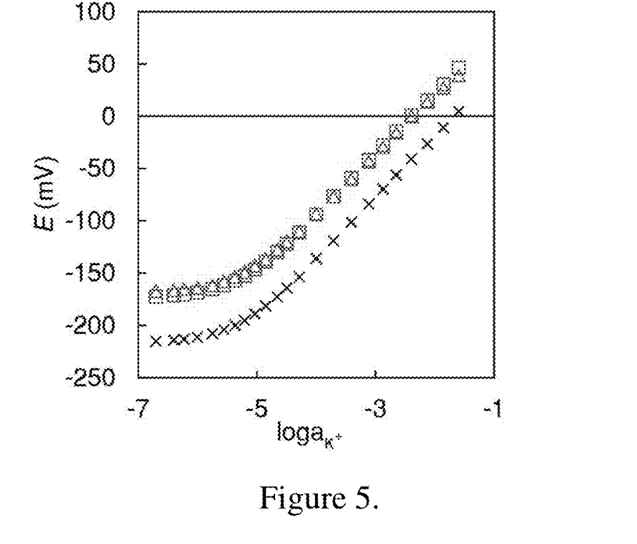
FIG. 5 is a graphical view of potentials, E, of solid contact-selective electrodes as a function of $K^+$ activity electrodes.
Figure 6:
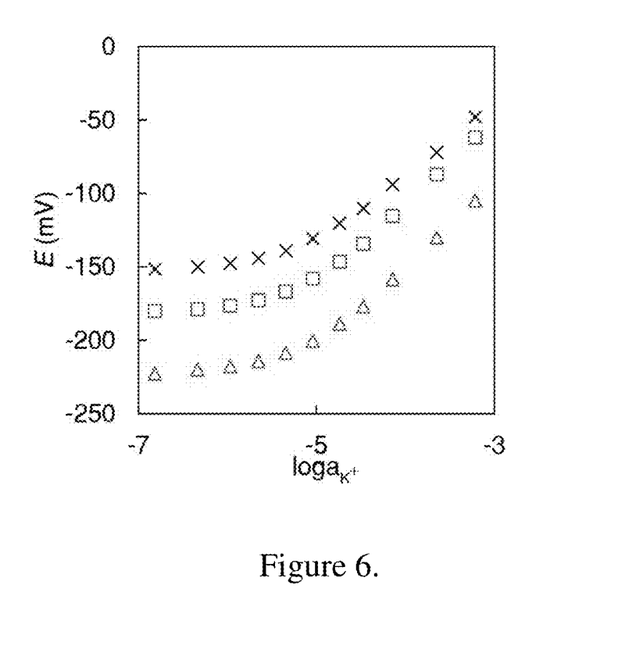
FIG. 6 is a graphical view of measured potential, E, of solid contact $K^+$-selective electrodes as a function of $K^+$ activity with a 100 mM NaCl background.
Figure 7:
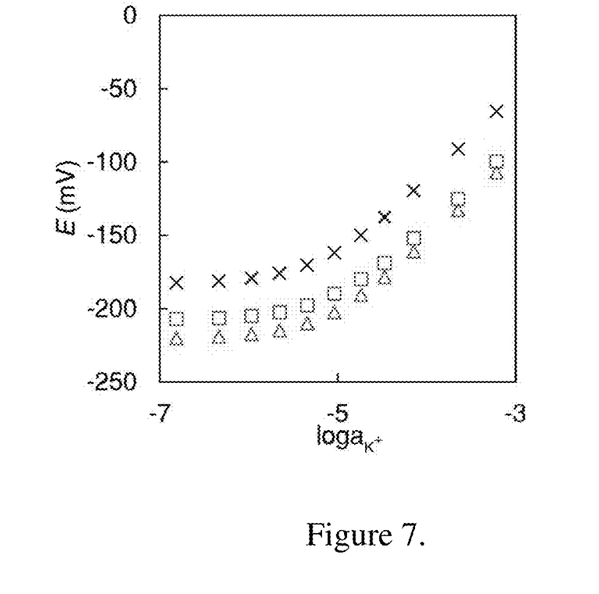
FIG. 7 is a graphical view of measured potential, E, of solid contact $K^+$-selective electrodes as a function of $K^+$ activity with a 100 mM NaCl background.

Photopolymerization of K$^+$-selective membranes containing freely dissolved valinomycin as ionophore resulted in transparent membranes that also strongly adhered to functionalized PET, Surface 6. Photopolymerization of the same K$^+$-selective membranes onto native PET, Surface 1, resulted in membranes that delaminated from PET during removal from the quartz glass plates and could not be used for electrochemical measurements. After conditioning of the covalently attached membranes, the membranes appeared opaque. FIG. 5 illustrates potentials, E, of solid contact-selective electrodes as a function of K$^+$ activity. Each symbol represents the value of an identically prepared solid contact electrode. E was measured relative to a free-flowing double-junction reference electrode with 1.0 M lithium acetate bridge electrolyte. All E values are corrected for liquid junction potentials at the free-flowing double junction. Measurement of the response of three identically prepared electrodes resulted in a Nernstian slope of 58.26±0.25 mV/decade, an electrical resistance of 859±830 MΩ, lower detection limit of −5.3±0.1, and selectivities (logKKI,JPOT; see FIGS. 6 and 7) toward Li$^+$, and Na$^+$ of −4.1±0.1 and −4.0±0.1, respectively, where E, of solid contact K$^+$-selective electrodes was measured as a function of K+ activity with a 100 mM LiCl background. Each symbol represents the value of an identically prepared solid contact electrode. E was measured relative to a free-flowing double-junction reference electrode with 1.0 M lithium acetate bridge electrolyte. All E values are corrected for liquid junction potentials at the free-flowing double junction. Previous reports of crosslinked polyacrylate matrices that only differed by a decreased cross-linker and initiator percent (0.1 and 1.2 wt %, respectively) match that of the results presented here, which indicates that the covalent attachment does not influence the electrochemical performance of the membranes.

Ionic-Liquid Based Reference Membranes

Figure 8:
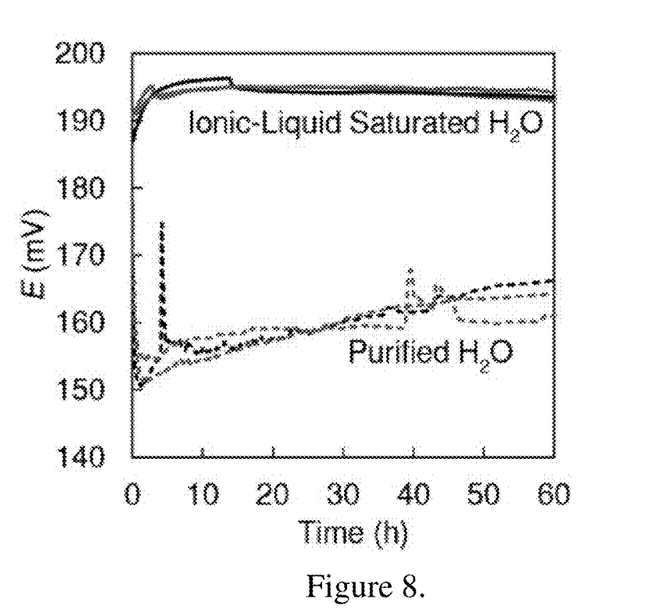
FIG. 8 is a graphical image of potentials, E, of ionic-liquid based reference membranes mounted onto Philips electrodes bodies.

Photopolymerization of solutions containing methyl methacrylate as monomer, ethylene glycol dimethacrylate as crosslinker, 2,2-dimethoxy-2-phenylacetophenone as photoinitiator, and 1-octyl-3-methylimidazolium bis-(trifluoromethyl sulfonyl)imide (50 wt %) to control the phase boundary potential at the sample-membrane interface resulted in transparent polymer films. Prior to use of a solid contact setup, the membranes were mounted onto Philips electrode bodies to determine their potential stability in a conventional setup with an inner filling solution. Directly after their fabrication, i.e., without any conditioning, three electrodes were exposed to purified H$_2$O and three electrodes were exposed to H$_2$O saturated with 1-octyl-3-methylimidazolium bis-(trifluoromethyl sulfonyl)imide. Potential measurements over the next 60 h are presented in FIG. 8 where potentials, E, of ionic-liquid based reference membranes mounted onto Philips electrodes bodies. Solid lines indicate data measured in water samples saturated with the ionic liquid 1-octyl-3-methylimidazolium bis-(trifluoromethyl sulfonyl)imide saturated H$_2$O and dashed lines refer to measurements in purified H$_2$O.

Potentials measured in purified H$_2$O decreased 20-30 mV over the first two hours, followed by a smaller upward potential drift. Potentials measured in ionic-liquid saturated H$_2$O increased 4-7 mV over two hours and then stabilized.

Potential drifts after the initial equilibration ("conditioning") were 154±80 µV/h and −26±20 µV/h for purified $H_2O$ and ionic-liquid saturated $H_2O$, respectively (reported values are 4 to 60 h). In practice, the limiting cases represented by a beaker containing purified water is not likely to be encountered. Dissolution of ionic liquids from reference membranes into purified $H_2O$ in a beaker slowly increases the sample concentration of the ionic liquid, affecting the measured potential. In many real-life scenarios, large or continuously replaced samples are much more common, preventing the ionic liquid from accumulating. Therefore, as common in prior work with reference electrodes comprising ionic liquid-doped reference membranes, all further tests with solid-contact reference electrodes were performed in ionic liquid saturated solutions, which is a simple way to prevent changes in the ionic liquid concentration of the sample. This way, potential drifts caused by changes in the trans-membrane potential or the phase boundary potential at the interface of the reference membrane and, in the case of solid-contact electrodes, the inner reference electrode are much more readily recognizable.

Solid-Contact Ionic-Liquid Based Reference Electrodes

Figure 9:
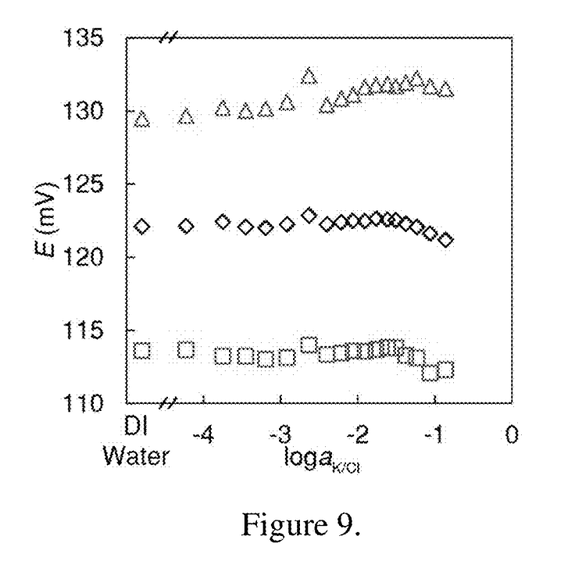
FIG. 9 is a graphical image of electrode potentials of solid contact reference electrodes measured as a function of $K^+/Cl^-$ activity of a KCl solution.
Figure 10:
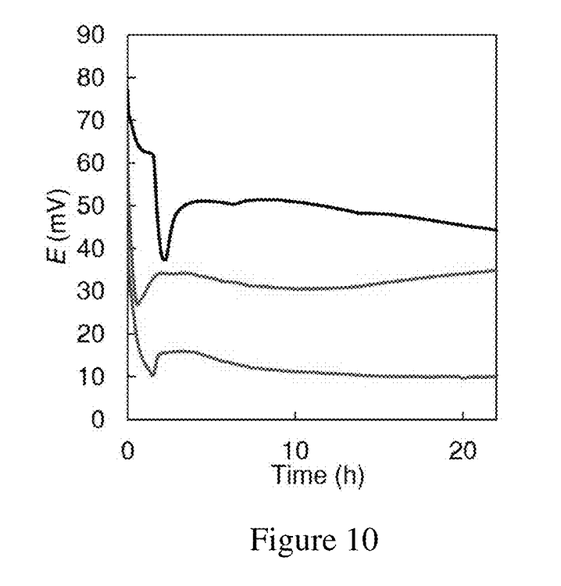
FIG. 10 is a graphical view of measured potentials, E, of solid-contact reference electrodes with ionic-liquid doped reference membranes over time in an aqueous solution saturated with 1-octyl-3-methyl-imidazolium bis-(trifluoromethyl sulfonyl)imide.

Photopolymerization of reference membranes solutions onto functionalized PET, Surface 6, resulted in transparent membranes that strongly adhered to the substrate. As illustrated in FIG. 9, electrode potentials of solid contact reference electrodes were measured as a function of $K^+/Cl^-$ activity of a KCl solution. E was measured relative to a free-flowing double-junction reference electrode. All E values are corrected for liquid junction potentials at the free-flowing double junction. Blue triangles, red squares, and black diamonds represent data that are each from a different electrode. The potentials measured in ionic liquid saturated solutions varied a maximum of ~2 mV from solutions containing only ionic liquid to those with KCl (logaK/Cl=− 4.22 to −0.86). This observation is consistent with reports of other ionic liquid-based reference electrodes, where the reference potential provided by such electrodes is determined by the ionic liquid distributing across the interface of the sample and the reference membrane and not the concentration of hydrophilic electrolyte. In FIG. 10, measured potentials, E, of solid-contact reference electrodes with ionic-liquid doped reference membranes over time in an aqueous solution saturated with 1-octyl-3-methyl-imidazolium bis-(trifluoromethyl sulfonyl)imide are illustrated. Potential stabilities were measured over one day to be 180±280 µV/h. This stability is one order of magnitude less than that reported for reference electrodes with 1-octyl-3-methylimidazolium bis-(trifluoromethyl sulfonyl)imide contained in nanochannels; however, those electrodes were measured solutions that were not saturated with ionic liquid. The electrical electrode resistance was measured to be 640±110 kΩ (95% confidence interval), which is of the same magnitude as for those nanochannel-type electrodes.

Summarization of Results

PET was surface functionalized using a treatment of potassium tert-butoxide/ethylene glycol and further reaction with methacryloyl chloride. This treatment resulted in a surface that had reactive methacrylate functional groups. In addition, treatment with potassium tert-butoxide/ethylene glycol instead of aqueous solutions of NaOH resulted in the removal of carboxylic acid functional groups. Photopolymerization of crosslinked acrylate and methacrylate polymers onto the functionalized surface resulted in membranes that were covalently attached and could not be removed.

Photopolymerization of $H^+$- and $K^+$-selective membranes, with covalently attached and freely dissolved ionophores, respectively, onto functionalized PET, Surface 6, resulted in electrodes with Nernstian responses. Selectivities were consistent with reports of ionophore-doped ISEs with polyacrylate matrices, indicating the broad applicability of this technique for the fabrication of sensors for a wide variety of analytes. Moreover, these electrodes were superior to electrodes that were not covalently attached to the underlying substrate in both long-term measurements and in experiments where the electrodes were under mechanical stress.

With the functionalized PET, Surface 6, ionic liquid reference membranes were able to be covalently linked to the PET by photopolymerization, where the methacrylate matrices also showed excellent adhesion. The resulting ionic liquid-based reference electrodes had stable potentials in solutions with changing concentrations of KCl. In addition, measured resistances (640±110 kΩ) and potential stabilities (180±280 µV/h) were constant with those reported for similar devices.

Covalent attachment of both reference and ion-selective membranes allowed for membranes which could not be removed from the underlying substrate. This makes these devices and technique suitable for the fabrication of electrodes for applications where they would be under mechanical stress or used for long term measurements.

Methods

Poly(Ethylene Terephthalate) Surface Modification

PET sheets for the preparation of solid-contact reference and $H^+$-selective electrodes were roughened with 600 grit sand paper, washed with ethanol (3 times), hexane (3 times), and dried under vacuum for 24 h prior to surface functionalization. PET sheets used to test adhesion of membranes were not sanded. For treatments with NaOH, five PET sheets (2×5 cm2) were submerged in stirred 1 M NaOH and heated to 65° C. for 7 h, followed by rinsing with water (5 times), 0.1 M HCl (4 times), and water (5 times) and drying under vacuum at room temperature for 24 h. For treatments with potassium tert-butoxide/ethylene glycol, five PET sheets (2×5 cm2) were submerged in a 0.6 M potassium tert-butoxide in ethylene glycol while stirring for 4 h, followed by rinsing with $H_2O$ (5 times), ethanol (3 times) and drying under vacuum at room temperature for 24 h.

Dried PET sheets that were surface functionalized either with NaOH or potassium tert-butoxide/ethylene glycol as described above were submerged into a solution of 19 mL of triethylamine in 150 mL of anhydrous dichloromethane under argon at 0° C. Then, 10 mL of methacryloyl chloride was added dropwise over 15 min., and the reaction mixture was removed from the 0° C. bath and kept at ambient temperature for 12 h. Finally, the PET sheets were washed with dichloromethane (4 times), acetone (3 times), water (3 times), and acetone (3 times), followed by drying under vacuum at room temperature for 48 h.

Adhesion of Crosslinked Butyl Acrylate Membranes

A 0.5 g solution consisting of 97 wt % butyl acrylate, 1.5 wt % 1,6-hexanediol diacrylate, and 1.5 wt % 2,2-dimethoxy-2-phenylacetophenone was stirred for 5 min. Native PET and PET functionalized first with potassium tert-butoxide/ethylene glycol and then methacryloyl chloride were secured to a quartz glass plate with double-sided adhesive tape to ensure a level surface. Height of the tape and PET was measured to be ~300 m. Two 0.50 mm thick feeler gauges were placed as spacers on opposing sides of the PET. The membrane solution was then poured on top of the PET and a quartz glass plate was placed onto the gauges, which resulted in a 200 µm layer of solution between the PET and upper quartz plate. A steady flow of $N_2$ was passed through the space between the quartz plates. The mixture was exposed for 11 min to a broad band UV source with peak output at 365 nm.

Ion-Selective Electrode Fabrication

Solid-contact ion-selective electrodes were prepared by securing three equally spaced 0.50 mm Ag wires to functionalized PET sheets with a thin pad of 8331 silver conductive epoxy adhesive (~0.3 cm diameter), and the epoxy was allowed to dry for 24 h. Colloid-imprinted mesoporous (CIM) carbon26 was drop-cast onto each conductive epoxy area by three sequential additions of 2 μL of a sonicated CIM carbon solution (20 mg CIM carbon and 0.5 mL tetrahydrofuran), followed by 10 minutes of drying in between additions and 12 h at the end. For $H^+$-selective electrodes, a 0.50 g solution containing 90 wt % butyl acrylate, 1.5 wt % 1,6-hexanediol diacrylate, 1.5 wt % 2,2-dimethoxy-2-phenylacetophenone, and 7 wt % 2-(dimethylamino)ethyl methacrylate was stirred for 5 min, followed by addition of 36 mg of potassium tetrakis(4-chlorophenyl) borate (33 mol % of 2-(dimethylamino)ethyl methacrylate) and stirring for 10 min. For $K^+$-selective electrodes, a 0.50 g solution containing 97 wt % butyl acrylate, 1.5 wt % 1,6-hexanediol diacrylate, and 1.5 wt % 2,2-dimethoxy-2-phenylacetophenone was stirred for 5 min, followed by addition of 10.5 mg of valinomycin and 3.0 mg of potassium tetrakis(4-chlorophenyl)borate (60 mol % with respect to valinomycin) and stirring for 10 min. An aliquot of either of the ionophore-containing solutions was poured onto the modified PET with CIM carbon/Ag leads and UV-polymerized over 11 min to give a 200 μm ion-selective membrane, as described for the adhesion measurements.

Reference Membranes

Free-standing reference membranes were prepared from 1.0 g solutions containing 48.5 wt % methyl methacrylate, 0.75 wt % ethylene glycol dimethacrylate, 0.75 wt % 2,2-dimethoxy-2-phenylacetophenone, and 50 wt % 1-octyl-3-methylimidazolium bis-(trifluoromethyl sulfonyl)imide or 1-dodecyl-3-methylimidazolium bis(trifluoromethyl sulfonyl)imide (pre-saturated with AgCl). These mixtures were contained between two quartz glass plates separated by two 200 μm feeler gauges. Mixture was polymerized over 15 min with a broad band UV source as described above for the adhesion measurements. Membranes doped with 1-dodecyl-3-methylimidazolium bis(trifluoromethyl sulfonyl)imide were observed visually to be phase separated and were not pursued further.

Solid-contact reference electrodes were prepared by securing three equally spaced AgCl-coated Ag foil ribbons (0.10×1.0 cm2) to functionalized PET (2.0×5.0 cm2) with double-sided adhesive tape. The same type of component mixture and method of UV polymerization used to prepare 200 μm thick reference membranes on the PET sheet as for the preparation of free-standing reference membranes.

Additional Information Relating to Materials, Sources of Materials Used in the Examples, Instrumentation and Testing Methods Materials AgCl, KCl, LiCl, NaCl, LiOH, KOH, 1 M NaOH, 1 M HCl, KH2PO4, K2HPO4, FeCl3, methyl methacrylate, ethylene glycol dimethacrylate, butyl acrylate, 1,6-hexanediol diacrylate, 2,2-dimethoxy-2-phenylacetophenone, 2-(dimethylamino)ethyl methacrylate, ethanol, hexanes, methacryloyl chloride, potassium tert-butoxide, basic alumina, valinomycin, and potassium tetrakis(4-chlorophenyl) borate were purchased from Sigma-Aldrich, Ag wires (0.05 mm diameter, >99.9%) and Ag foil (0.05 mm thick) from Alfa Aesar, 1-octyl-3-methylimidazolium bis-(trifluoromethyl sulfonyl)imide and 1-dodecyl-3-methylimidazolium bis(trifluoromethyl sulfonyl)imide from Ionic Liquid Technologies, a pH glass electrode from Hanna Instruments, a 3UV lamp from Analytikjena, poly(ethylene terephthalate) (PET) sheets (0.005 in. thick) from McMaster-Carr Supply Company, 8331 silver conductive epoxy adhesive from MG Chemicals, and quartz glass plates (6 by 6 in., ⅛ in. thick) from Fisher Scientific. Methyl methacrylate, ethylene glycol dimethacrylate, butyl acrylate, 1,6-hexanediol diacrylate, and 2-(dimethylamino)ethyl methacrylate were filter through basic alumina before use. All other chemicals were used as received.

Preparation of AgCl-Coated Ag Foil

Ag ribbons (cleaned in 0.1 M HCl for 15 min) were transferred into a 1.0 M FeCl3 and 0.10 M HCl solution. After stirring for 10 minutes, the resulting AgCl-coated Ag foil ribbons were rinsed with $H_2O$ and dried.

Contact Angle Measurements

Contact angles were measured with a contact-angle goniometer (Erma, Tokyo, Japan) with three drops (4, 6, 8 μL) of purified $H_2O$ or 10 mM phosphate buffer (pH=12.3). Averages were computed from six advancing contact-angle measurements at three separate locations on the PET surface.

Potentiometric Measurements

All potentials were measured at room temperature in stirred solutions with an EMF 16 potentiometer (Lawson Labs, Malvern, Pa., USA) controlled with EMF Suite 1.02 software. All potentials were measured relative to a free-flowing double-junction reference electrode 46 with a 3 M KCl bridge electrolyte and AgCl-saturated 3 M KCl reference electrolyte (DX200, Mettler Toledo, Switzerland). The bridge electrolyte was changed to 1 M lithium acetate for measurements with $K^+$-selective electrodes.

Free-Standing Ionic-Liquid Reference Membranes

Reference membranes disks (1.0 cm diameter) were mounted onto Philips-type electrode bodies (Glasbläserei Möller, Zürich, Switzerland). The inner filling solution was 1.0 mM KCl, saturated with 1-octyl-3-methylimidazolium bis-(trifluoromethyl sulfonyl)imide into which a AgCl-coated Ag wire was inserted as inner reference electrode.

$H^+$-Selective Electrodes

Solid-contact $H^+$-selective electrodes were placed for conditioning in 10 mM phosphate buffer (pH=7.1) for 12 h before potentiometric measurements. To measure calibration curves, the electrodes were placed in a 10 mM potassium phosphate buffer solution (pH=7.1), and after approximately 10 minutes the pH was adjusted by addition of aliquots of 1.0 M NaOH until the lower limit of detection was reached. This was followed by addition of aliquots of 1.0 M HCl until the upper detection limit was reached. The pH was monitored with a pH glass electrode.

Selectivity was measured using the fixed interference method. Electrodes were placed in solutions containing 1.0 mM potassium phosphate buffer (pH=7.1) and 0.10 M LiCl, NaCl, or KCl. The pH was adjusted by additions of 1.0 M LiOH, NaOH, or KOH, respectively, until the lower limit of detection was reached.

$K^+$-Selective Electrodes

Solid-contact $K^+$-selective electrodes were placed for conditioning in 1.00 mM KCl for 24 h before potentiometric measurements. To measure calibration curves, the electrodes were placed in deionized, purified water and the concentration of KCl was adjusted by additions from 10.0 mM and 1.00 M KCl stock solutions. Selectivity was measured using the fixed interference method. Electrodes were placed in solutions containing 0.10 M LiCl or NaCl. KCl concentrations were adjusted by additions from 10.0 mM and 1.00 M KCl stock solutions.

Resistance Measurements

Electrical resistances of solid-contact reference electrodes were measured with a three-electrode setup using a Solartron 1255B frequency response analyzer with an SI 1287 electrochemical interface (Farnborough, Hampshire, U.K.) controlled by ZPlot software (Scribner Associates, Southern Pines, N.C.). 48 Measurements were performed at the open circuit potential with an AC amplitude of 10 mV in 100 mM KCl. Data was collected using a Pt foil (3 by 3 cm) counter electrode and a AgCl/Ag wire reference electrode. All data fits were performed using Mathematica 10.1 (Champaign, Ill.).

Electrical resistances of solid-contact pH electrodes were measured with the known shunt method. 49 The potentials (E1) of the $H^+$-selective electrode were first measured in a 10 mM potassium phosphate buffer solution (pH=7.1) versus a free-flowing double junction reference electrode. The potentials (E2) were measured a second time after the $H^+$-selective electrode was shorted to the free-flowing double junction reference electrode through a 10 MΩ resistor. Resistances were calculated as 10 MΩ☐ (E1−E2)/E2.

Although the present description has been described with reference to preferred embodiments, workers skilled in the art will recognize that changes may be made in form and detail without departing from the spirit and scope of the description.

What is claimed is:

1. A method of making an electrode, the method comprising:

treating a polymeric substrate by hydrolysis, ozone treatment or carbon-carbon double-bond oxidation to produce hydroxyl functional groups on the surface of the polymeric substrate;

reacting methacryloyl chloride with the hydroxyl functional groups of the polymeric substrate to provide a reactive surface; and photopolymerizing or thermally polymerizing to produce crosslinked acrylate or methacrylate polymers or a mixture of both on the reactive surface to produce a sensor covalently bonded to the polymeric substrate.

2. The method of claim 1 wherein the polymeric substrate comprises a polyester, a polyamide, a polyurethane or copolymers thereof, polypropylene, polytetrafluoroethylene or copolymers thereof or polystyrene.

3. The method of claim 2 wherein the polyester comprises either poly(ethylene terephthalate) or poly(ethylene terephthalate glycol).

4. The method of claim 1 wherein the polymeric substrate is treated with potassium tert-butoxide/ethylene glycol to produce hydroxyl functional groups.

5. The method of claim 1 wherein the polymeric substrate is treated with an aqueous solution of NaOH.

6. The method of claim 1 wherein the sensor comprises an ion selective membrane.

7. The method of claim 1 wherein the electrode produced is a reference electrode.

8. The method of claim 1 wherein the methacrylate being polymerized is methyl methacrylate.

9. The method of claim 1 wherein the acrylate being polymerized is butyl acrylate.

10. The method of claim 1 wherein the sensor is a potentiometric sensor, ion-sensitive field effect transistor, a voltammetric sensor, an amperometric sensor, a coulometric sensor, or an impedance sensor.

* * * * *